(12) United States Patent
Toman (10) Patent No.: US 9,066,475 B1
(45) Date of Patent: Jun. 30, 2015

(54) ALIGNMENT APPARATUS FOR AN ARTICULATING IRRIGATION SYSTEM

(75) Inventor: Benjamin J. Toman, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 587 days.

(21) Appl. No.: 13/423,496

(22) Filed: Mar. 19, 2012

Related U.S. Application Data

(60) Provisional application No. 61/466,547, filed on Mar. 23, 2011.

(51) Int. Cl.
*B05B 3/00* (2006.01)
*B05B 3/18* (2006.01)
*A01G 25/09* (2006.01)
*B05B 15/00* (2006.01)

(52) U.S. Cl.
CPC .............. *A01G 25/092* (2013.01); *B05B 15/00* (2013.01); *A01G 25/095* (2013.01); *A01G 25/09* (2013.01)

(58) Field of Classification Search
CPC .. A01G 25/092; A01G 25/095; A01G 25/097
USPC ......... 239/166–168, 722, 723, 728–733, 741, 239/587.2–587.4; 198/300, 313, 315, 667; 285/261–271, 920
See application file for complete search history.

(56) References Cited

U.S. PATENT DOCUMENTS

| 3,921,908 | A | * | 11/1975 | Zimmerer ...................... 239/729 |
| 4,508,269 | A | * | 4/1985 | Davis et al. .................... 239/729 |
| 4,549,694 | A | * | 10/1985 | Davis et al. .................... 239/729 |
| 4,569,481 | A | * | 2/1986 | Davis et al. .................... 239/729 |
| 5,628,262 | A | * | 5/1997 | Nelson .......................... 111/130 |
| 6,161,769 | A | * | 12/2000 | Kircher et al. ................. 239/2.2 |
| 7,546,963 | B2 | * | 6/2009 | Sieling .......................... 239/728 |
| 7,878,429 | B2 | * | 2/2011 | Parod et al. .................... 239/735 |
| 7,886,992 | B2 | * | 2/2011 | Wiseman et al. ............... 239/17 |
| 8,464,964 | B2 | * | 6/2013 | Wiseman et al. ............... 239/17 |
| 8,517,289 | B2 | * | 8/2013 | Parod et al. .................... 239/728 |
| 2007/0221763 | A1 | * | 9/2007 | Sieling .......................... 239/728 |
| 2009/0084615 | A1 | * | 4/2009 | Parod et al. .................... 180/2.2 |

* cited by examiner

*Primary Examiner* — Len Tran
*Assistant Examiner* — Alexander Valvis
(74) *Attorney, Agent, or Firm* — Milligan PC LLO (57) ABSTRACT

An irrigation alignment apparatus is described that couples a main section assembly to an extension section assembly. In an implementation, the irrigation alignment apparatus includes a ball connector configured to couple to the main section assembly and a socket for receiving the ball connector, which is configured to at least partially pivot about the ball connector. The socket is coupled to the extension section assembly. The irrigation alignment apparatus also includes a socket pulley coupled to the socket about a centroid of the ball connector and is configured to at least partially pivot the socket about the ball connector. The socket pulley is configured to connect to a linking member that is coupled to a camshaft via a camshaft pulley. The camshaft is configured to indicate a positional alignment of the extension section assembly.

20 Claims, 7 Drawing Sheets

ALIGNMENT APPARATUS FOR AN ARTICULATING IRRIGATION SYSTEM

CROSS-REFERENCE TO RELATED APPLICATIONS

The present application claims the benefit under 35 U.S.C. §119(e) of U.S. Provisional Application Ser. No. 61/466,547, entitled ANGULAR ALIGNMENT CONTROL SYSTEM FOR AN ARTICULATING CENTER PIVOT IRRIGATION SYSTEM, filed on Mar. 23, 2011. U.S. Provisional Application Ser. No. 61/466,547 is herein incorporated by reference in their entireties.

BACKGROUND

Modern day agriculture has become increasingly efficient in the past century and this trend must continue in order to produce a sufficient food supply for the ever increasing world population. A notable advancement in agricultural production was the introduction of mechanized irrigation systems such as center pivot and linear move irrigators. These irrigation systems make it possible to irrigate entire fields thereby reducing a crop yield's vulnerability to extreme weather conditions. In more arid environments, mechanized irrigation systems are used to provide the amount of water and/or applicants to increase the available farmable acreage for an increased variety of crops and provide a profitable crop yield for that farmable acreage. In temperate environments, mechanized irrigation systems can be used to provide water to fields during extended periods without rain.

SUMMARY

An irrigation alignment apparatus is described that couples a main section assembly to an extension section assembly. The irrigation alignment apparatus is configured to allow the extension section assembly to pivot about the main section assembly to irrigate areas otherwise unavailable due to obstructions. In an implementation, the irrigation alignment apparatus includes a ball connector configured to couple to the main section assembly and a socket for receiving the ball connector, which is configured to at least partially pivot about the ball connector. The socket is configured to couple to the extension section assembly. The irrigation alignment apparatus also includes a socket pulley coupled to the socket about a centroid of the ball connector and is configured to at least partially pivot the socket about the ball connector. The socket pulley is configured to connect to a linking member that is coupled to a camshaft. The camshaft is configured to indicate a positional alignment of the extension section assembly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Cultivation areas, such as fields, may include one or more obstructions that restrict the movement of irrigation systems. For example, the cultivation areas may include a building, natural obstruction, or the like, which may prevent an irrigation section of the irrigation system from irrigating specified areas near the obstructed areas.

Accordingly, an irrigation system that includes an irrigation alignment apparatus is described. For example, the irrigation system may be a center pivot irrigation system having a main section assembly and an extension section assembly. The irrigation alignment apparatus is configured to allow the extension section assembly to pivot about the main section assembly to irrigate areas otherwise unavailable due to obstructions. In an implementation, the irrigation alignment apparatus includes a ball connector configured to couple to the main section assembly and a socket for receiving the ball connector, which is configured to at least partially pivot about the ball connector. The socket is configured to couple to the extension section assembly. The irrigation alignment apparatus also includes a socket pulley coupled to the socket about a centroid of the ball connector and is configured to at least partially pivot the socket about the ball connector. The socket pulley is configured to connect to a linking member that is coupled to a camshaft via a camshaft pulley. The camshaft may be in communication with a plurality of switches for controlling (e.g., selectively powering) at least one of the main section assembly or the extension section assembly (e.g., selectively powering the drive units of the respective section assembly). The camshaft is also configured to indicate a positional alignment of the extension section assembly. In an implementation, the linking member may be a flexible cogged belt, or a chain.

Example Implementations

Figure 1:
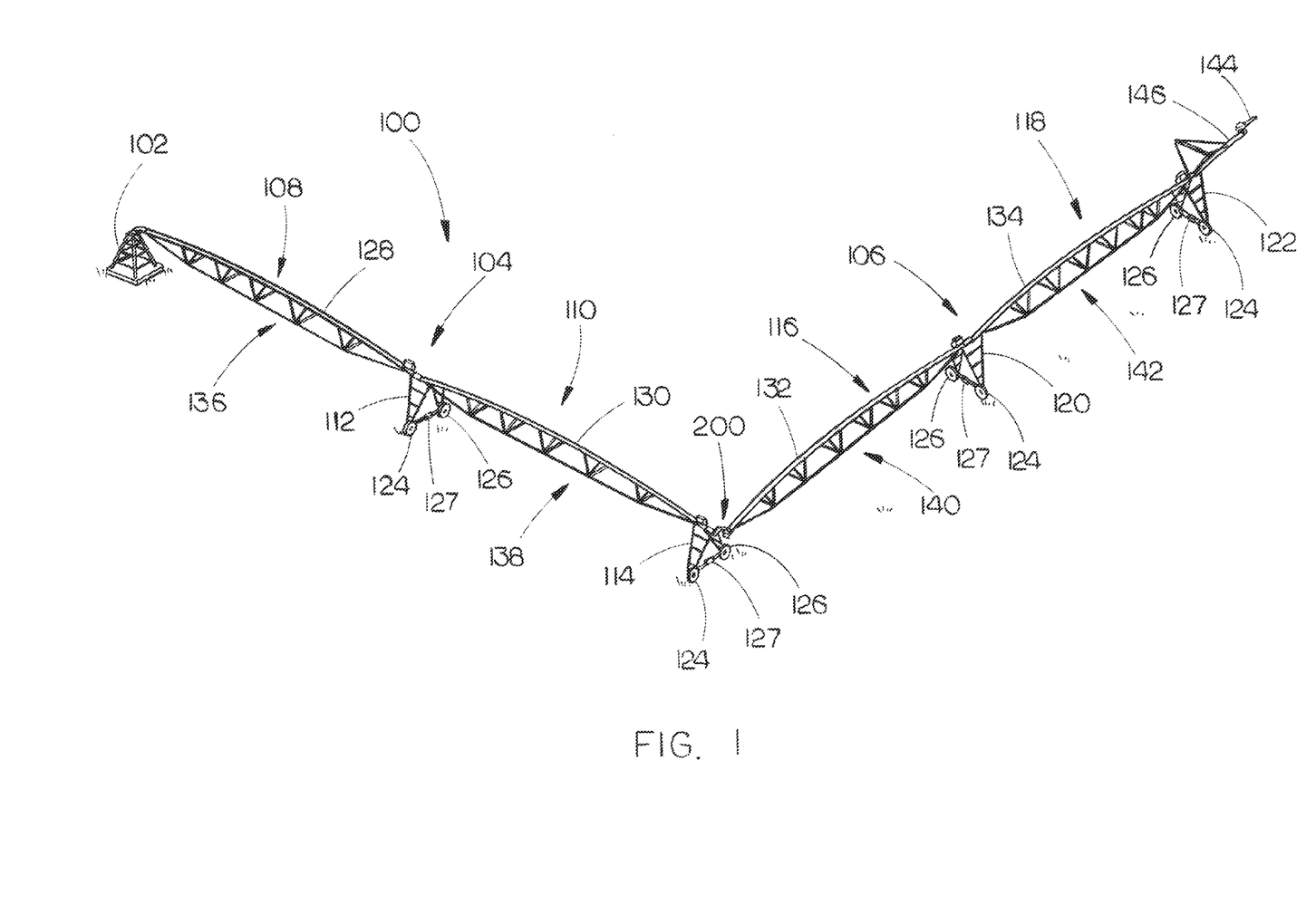
FIG. 1 is an isometric perspective view of an irrigation system in accordance with an example implementation of the present disclosure, wherein the irrigation system includes an irrigation alignment apparatus disposed between a main section assembly of the irrigation system and the extension section assembly of the irrigation system.
Figure 2A:
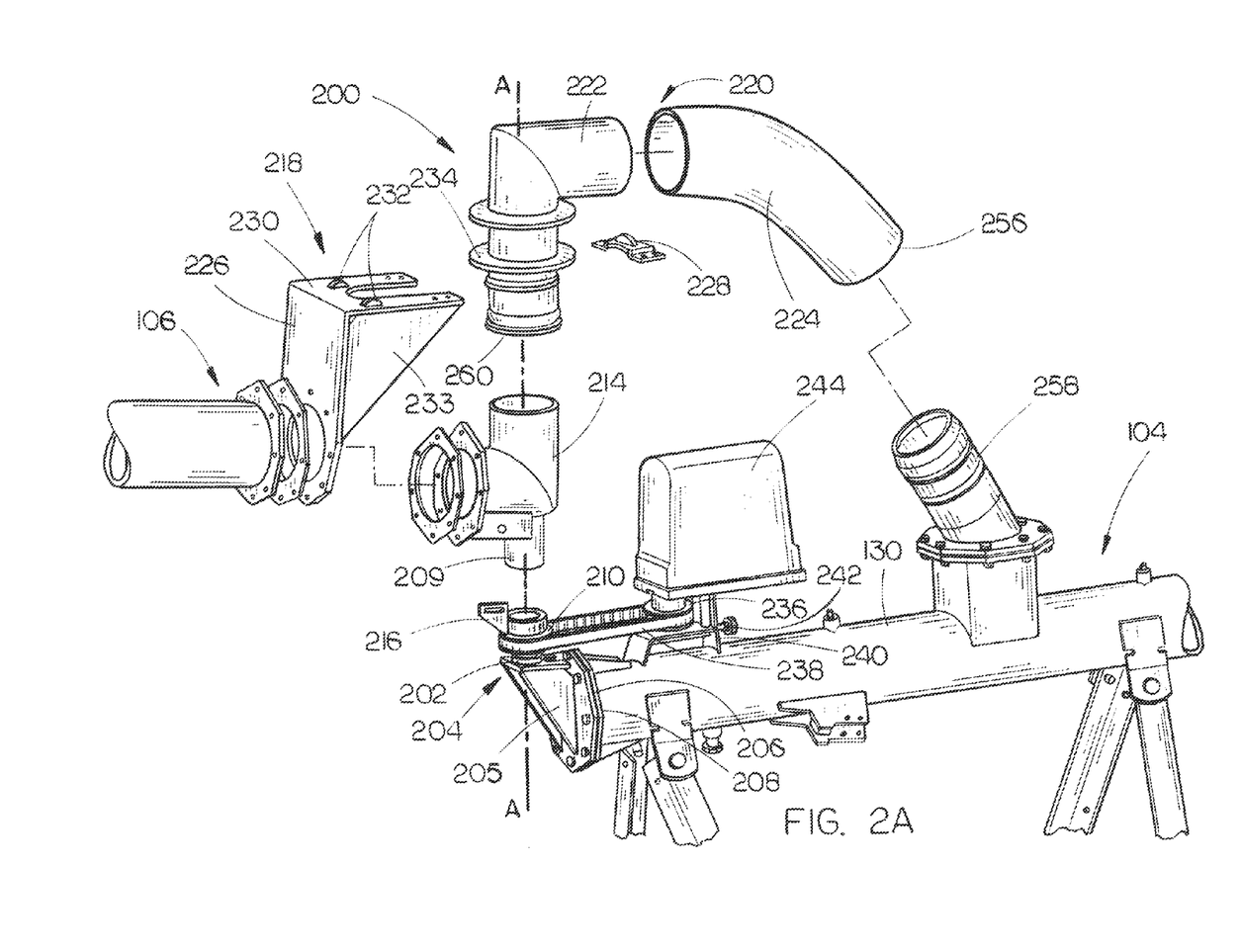
FIG. 2A is a partial exploded perspective view of the irrigation alignment apparatus that is configured to allow the extension section assembly to pivot about the axis A-A, wherein the irrigation alignment apparatus includes a socket and a socket pulley disposed over a ball connector, wherein the socket pulley is coupled to a camshaft pulley via a linking member, and the camshaft pulley is coupled to measurement and control instrumentation.
Figure 2B:
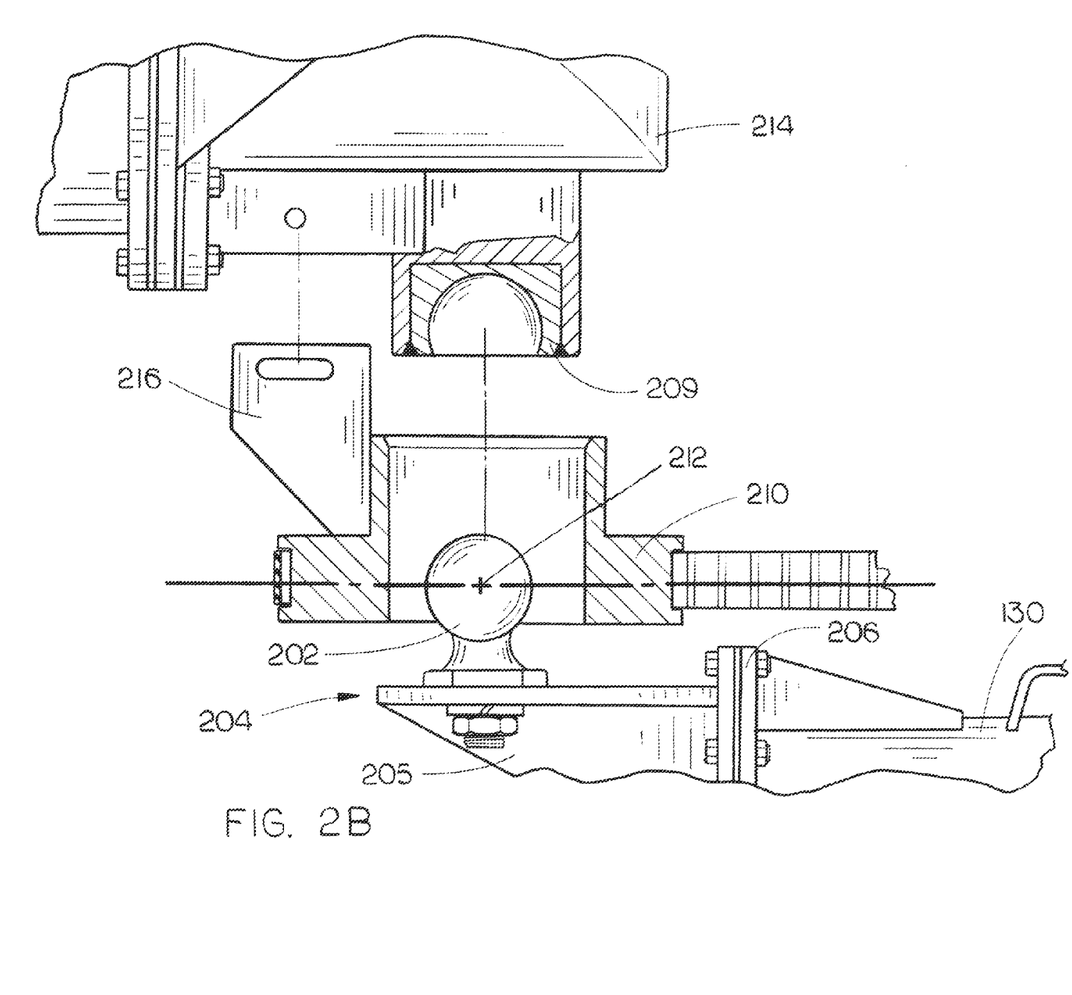
FIG. 2B is a partial exploded cross-sectional side elevation view of the socket and the socket pulley disposed over a centroid of the ball connector.
Figure 2C:
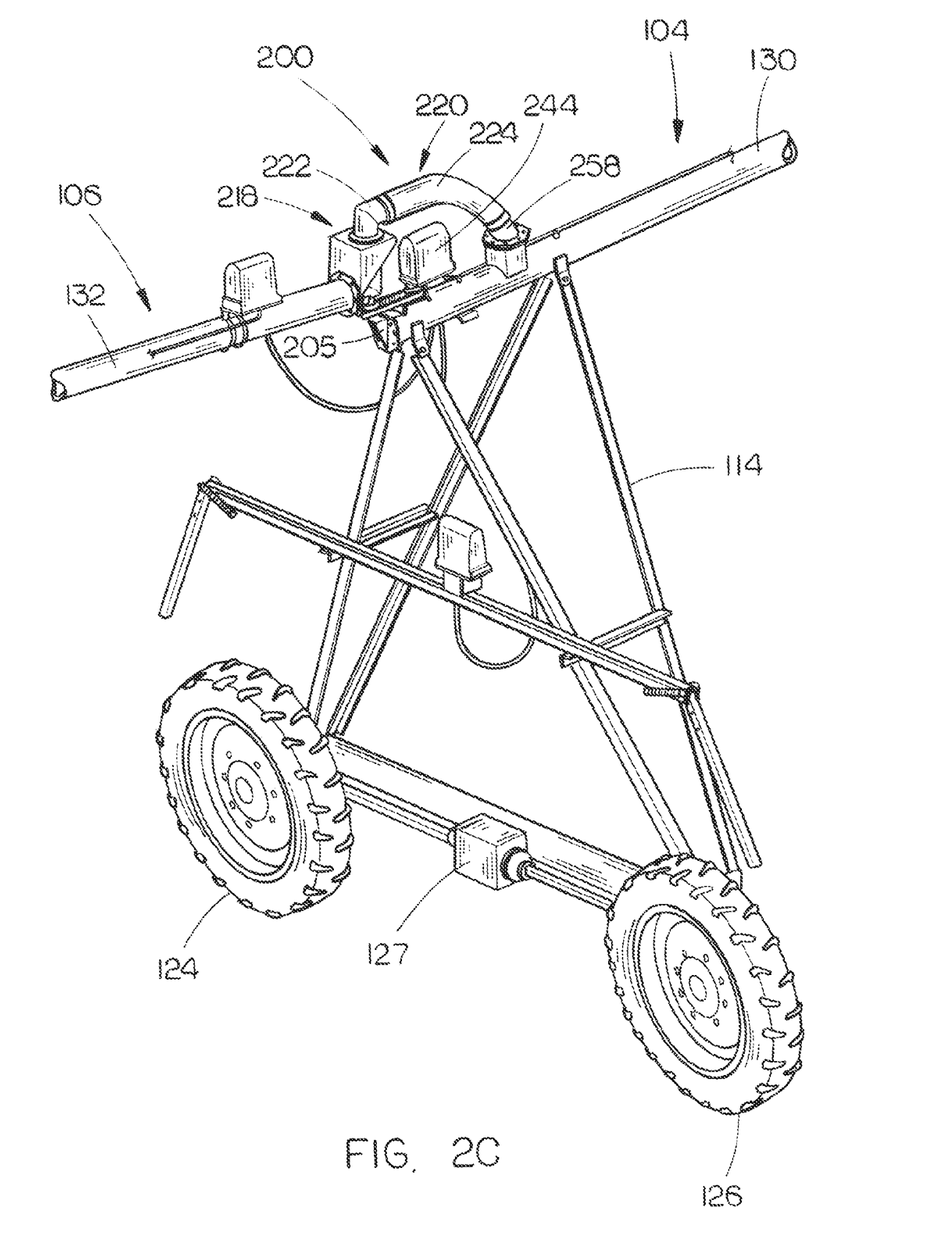
FIG. 2C is a partial isometric view of the irrigation alignment apparatus, wherein a connector conduit is disposed over a conduit of the main section assembly
Figure 2D:
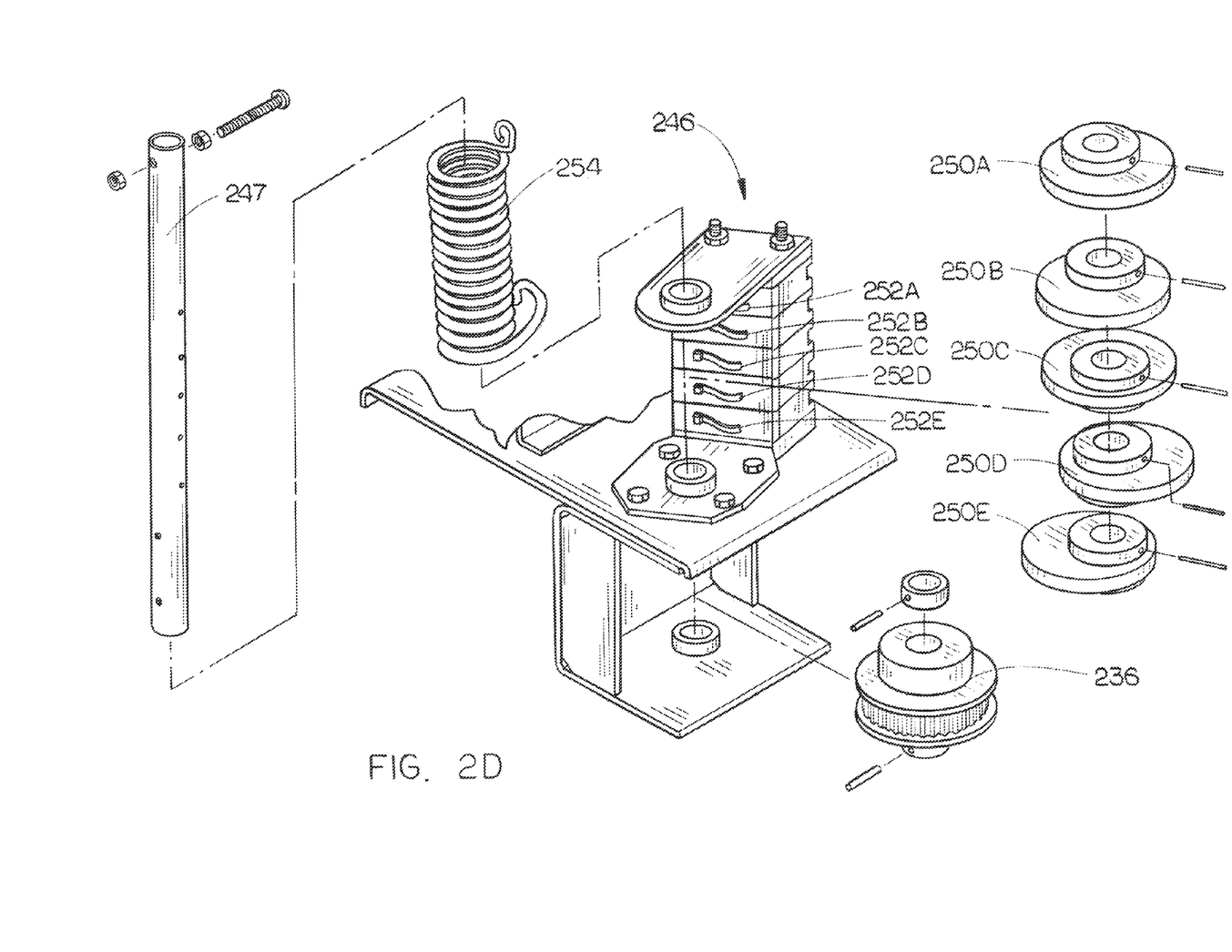
FIG. 2D is a partial exploded isometric view of the measurement and control instrumentation, wherein the measurement and control instrumentation includes the camshaft pulley coupled to a camshaft that is configured to selectively actuate at least one switch.
Figure 2E:
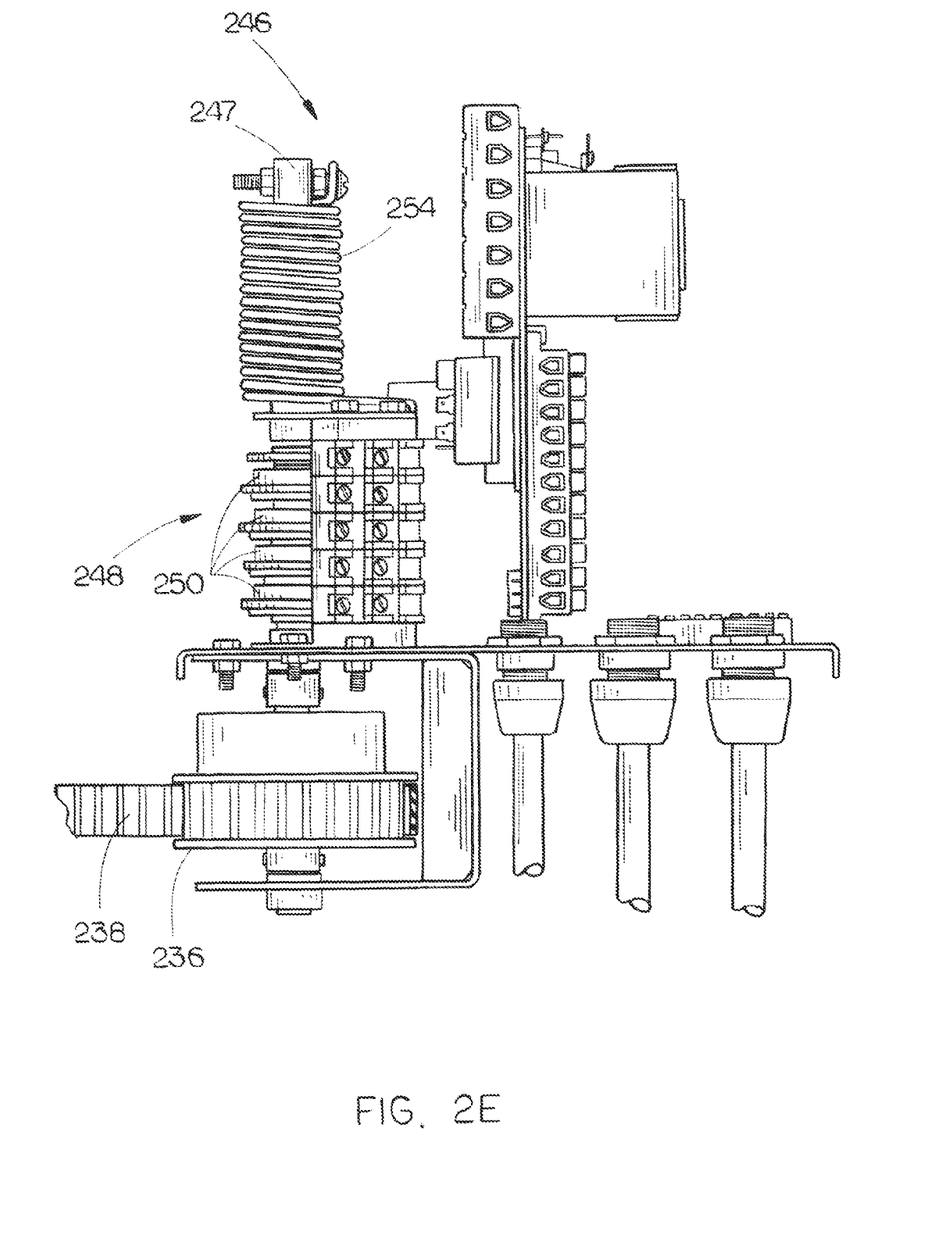
FIG. 2E is a partial side elevation view of the measurement and control instrumentation.
Figure 3:
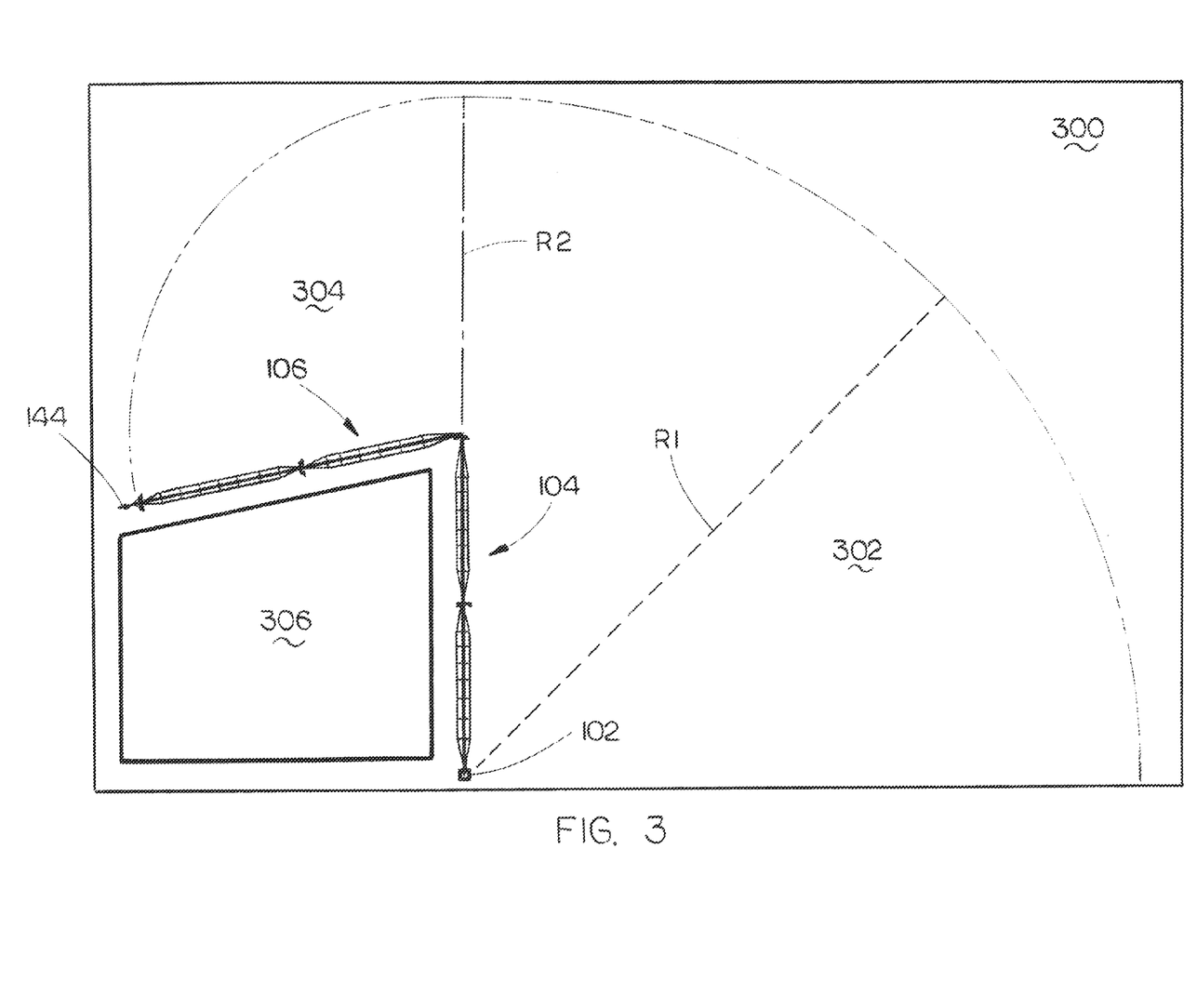
FIG. 3 is a top plan view of an environment, wherein the irrigation system shown in FIG. 1 is traversing a cultivation area.

FIGS. 1 through 3 illustrate an articulating irrigation system 100, such as a self-propelled irrigation system, in accordance with example implementations of the present disclosure. As shown, the system 100 includes a center pivot structure 102, a main section assembly 104 (main irrigation section assembly) coupled (e.g., connected) to the center pivot structure 102, and an extension section assembly 106 (extension irrigation section assembly) coupled to the main section assembly 104. The center pivot structure 102 has access to a well, a water repository (e.g., water tank), or other source of fluids, to furnish water to the irrigation system 100. For instance, the well may be located under the center pivot structure 102. In another instance, the well may be in close proximity to the cultivation area (e.g., field). The source of fluids may be coupled to a repository or other source of agricultural products to inject fertilizers, pesticides, and/or other chemicals into the fluids to create an applicant for application during irrigation. In an implementation, the center pivot structure 102 may comprise a frame assembly (e.g., galvanized steel frame assembly, and so forth).

The main section assembly 104 includes a number of interconnected spans 108, 110 supported by a tower structure 112 and an end tower structure 114. The extension section assembly 106 also includes a number of interconnected spans 116, 118 supported by a tower structure 120 and an end tower structure 122. It is understood that the main section assembly 104 and the extension section assembly 106 may include any number of spans and tower structures.

Each tower structure 112, 114, 120, 122 includes wheels 124, 126 to assist in traversing (e.g., pivoting) the articulating irrigation system 100 about a specified area (see field 300 shown in FIG. 3). In an implementation, at least one of the wheels 124, 126 may be driven by a suitable drive unit 127 (e.g., drive motor), or the like, to assist in traversing the system 100 about the specified area. In an implementation, each drive unit 127 may be controlled by a stop system so that the drive unit 127 can be slowed or completely shut down in the event of the detection of an adverse circumstance. In another implementation, the irrigation system 100 may also include a stop box that powers off all drive units 127 driving the main section assembly 104. In this implementation, the drive units 127 driving the extension section assembly 106 would drive the extension section assembly 106 at an increased rate as compared to the main section assembly 104.

As shown in FIG. 1, each span 108, 110, 116, 118 includes conduits 128, 130, 132, 134 (e.g., pipes) that are configured to carry (e.g., transport, provide, and so forth) liquid (e.g., applicant) along the length of the system 100 to numerous applicant dispersion devices (e.g., water emitting devices, sprinklers, and so forth) to irrigate the desired area. The applicant dispersion devices may be disposed along the conduits 128, 130, 132, 134 to furnish applicant to the cultivation areas. Each conduit 128, 130, 132, 134 may be coupled to one another to allow fluid communication between each conduit. In an implementation, the conduits 128, 130, 132, 134 may be supported by truss-type frameworks 136, 138, 140, 142 (framework structures). As shown in FIG. 1, the extension section assembly 106 includes an end gun 144 mounted to the end tower structure 122. For example, the end gun 144 may be mounted to the end tower structure 122 via a suitable support structure 146, such as a boom structure, or the like. In an implementation, the end gun 144 is a suitable pressure sprayer configured to be activated at the corners of a field or other designated areas to increase the amount of land that can be irrigated.

As shown in FIGS. 1 through 2E, the irrigation system 100 includes an irrigation alignment apparatus 200 (articulating center pivot joint) for coupling (e.g., connecting) the main section assembly 104 to the extension section assembly 106.

The irrigation alignment apparatus 200 is configured to allow the extension section assembly 106 to pivot about the main section assembly 104 (pivot about axis A) to irrigate areas otherwise unavailable due to obstructions, as described herein with respect FIG. 3. In an implementation, the irrigation alignment apparatus 200 is configured to allow the extension section assembly 106 to travel a total of about one hundred and sixty degrees (160°) past horizontal alignment (e.g., when extension section assembly 106 is at least substantially horizontally aligned with the main section assembly 104). As shown in FIGS. 2A and 2B, the irrigation alignment apparatus 200 includes a ball connector 202 coupled to a ball mount assembly 204. The ball mount assembly 204 includes a brace 205 having the ball connector 202 disposed over (e.g., coupled to) the brace 205. The ball mount assembly 204 is coupled (e.g., fastened via bolts, etc.) to a flange 206 at an end portion 208 of the conduit 130. The apparatus 200 also includes a socket 209 configured to receive the ball connector 202 and a socket pulley 210. The socket pulley 210 is coupled to the socket 209 about a centroid 212 (e.g., center) of the ball connector 202 when the socket 209 is engaged with the ball connector 202. As shown, the socket 209 is coupled to the extension section assembly 106 by way of a male swivel elbow assembly 214 (e.g., the male swivel elbow assembly 214 includes the socket 209). The pulley 210 is secured to the male swivel elbow assembly 214 via a tab 216 (and one or more fasteners [e.g., threaded fasteners, and so forth]). The tab 216 may be integrated with the pulley 210 in some implementations. By utilizing the tab 216 (e.g., a floating pulley configuration), the pulley 210 can be rotated about the socket 209 at any time to perform field adjustments. The pulley 210 is configured to pivot about the ball connector 202, which in turn allows the extension section assembly 106 to pivot about the ball connector 202.

In an implementation, apparatus 200 may also include a roller mount assembly 218 configured to pivot about a connector conduit 220 (e.g., a female swivel assembly). The connector conduit 220 includes a first conduit portion 222 coupled to a second conduit portion 224. The roller mount assembly 218 includes an angle 226 and a removable roller mount 228. The angle 226 includes an upper surface 230 that one or more rollers 232 extend through (e.g., extending through the upper surface 230) and a brace 233. As shown in FIG. 2A, the roller mount assembly 218 is configured to be received by the first conduit portion 222 (e.g., the removable roller mount 228 couples [e.g., via fasteners, and so forth] to angle 226 about the first conduit portion 222). Once positioned around the connector conduit 220 (the first conduit portion 222), the rollers 232 of the roller mount assembly 218 are configured to traverse about a flange 234 disposed around the connector conduit 220 when the extension section assembly 106 pivots about the ball connector 202.

The apparatus 200 further includes a camshaft pulley 236 that is coupled to the socket pulley 210 via a linking member, such as a belt 238. In an implementation, the belt 238 may be a flexible cogged belt, or the like. For example, the cogged belt may be a neoprene rubber belt. In yet another implementation, the linking member may be a chain. The camshaft pulley 236 has a diameter at least substantially equal to the diameter of the socket pulley 210 in one or more implementations. As shown in FIG. 2A, the camshaft pulley 236 is coupled to the main section assembly 104. In an embodiment, the camshaft pulley 236 is coupled (e.g., via fasteners, integrated to, and so forth) to a brace 240 (with a bracket 242) disposed over the conduit 130. The bracket 242 may be adjusted to tension the belt 238. The brace 240 is also configured to support a tower box 244. As shown in FIGS. 2D and 2E, the tower box 244 houses measurement and control instrumentation 246, which is coupled to the camshaft pulley 236 via shaft 247. In an implementation, the measurement and control instrumentation 246 is configured as a captive alignment assembly configured to measure (determine) a positional alignment of the extension section assembly 106. For example, the measurement and control instrumentation 246 includes a camshaft 248 having at least one cam 250 (see FIG. 2C) configured to selectively actuate (communicate with) one or more of the switches 252. For instance, the camshaft 248 may include five (5) cams 250 disposed about shaft 247 that are configured to selectively actuate a corresponding switch 252 (cams 250A through 250E correspond to respective switches 252A through 252E) depending upon the orientation (position) of the camshaft 248 (see FIGS. 2D and 2E). In an implementation, at least one of the switches 252 may be utilized to control (e.g., selectively power, etc.) the main section assembly 104 or the extension section assembly 106.

The camshaft 248 may have multiple orientations (e.g., cam orientations) indicating (e.g., corresponding) the positional alignment of the extension section assembly 106. For example, the camshaft 248 has a first orientation corresponding to the extension section assembly 106 having an at least substantially horizontal alignment (e.g., non-bend mode) with the main section assembly 104 (the extension section assembly 106 is at least substantially aligned along a horizontal axis defined by the main section assembly 104). In another example, the camshaft 248 has another orientation (e.g., a second orientation, a third orientation, a fourth orientation, etc.) corresponding to the extension section assembly 106 having non-horizontal alignment (e.g., bend mode) with the main section assembly 104. In this example, the orientation of the camshaft 248 corresponds to the angular alignment of the extension section assembly 106 with respect to the main section assembly 104. The camshaft 248 (the cams 250) may be pre-set before use of the system 100 (e.g., an operator/technician sets the cams 250A through 250E according to the requirements of the field 300). The various orientations of the camshaft 248 may be defined (positions of the cams 250 may be set) according to the characteristics of the field 300 (e.g., the dimensions of the field, obstructed/unobstructed areas of the field 300, and so forth). As a result, the orientation of the camshaft 248 indicates the relative position of the extension section assembly 106 with respect to the main section assembly 104. Thus, as the extension section assembly 106 pivots about the ball connector 202 (axis A-A), the cams 250 may selectively actuate the corresponding switches 252. For example, the belt 238 is configured to orient the camshaft 248 to a first orientation that causes a first cam 250A to selectively actuate a first switch 252A that selectively powers the drive unit 127. In another example, the belt 238 is configured to orient the camshaft 248 to a second orientation that causes a second cam 250B to selectively actuate a second switch 252B to prevent the extension section assembly 106 from impinging an undesirable location (e.g., power down the system 100 (e.g., drive units of the main section assembly 104 and the extension section assembly 106) before the extension section assembly 106 hits an obstruction). In this example, as shown in FIG. 2C, the measurement and control instrumentation 246 may include a biasing member 254 (e.g., a spring having a pre-set tension). In an implementation, the biasing member 254 may be a spring disposed about a shaft 247. If the apparatus 200 is compromised (e.g., the belt 238 disengages/breaks), the biasing member 254 is configured to cause the camshaft 248 to orientate the camshaft 248 to the second orientation to power down the irrigation system 100. For instance, the spring may have a pre-set tension while the apparatus 200 is at least substantially not comprised. However, when the apparatus 200 is compromised, the spring causes the camshaft 248 to orientate to the second orientation. In yet another example, the belt 238 is configured to orientate the camshaft 248 to a third orientation that causes a third cam 250C to selectively actuate a third switch 252C to actuate the end gun 144. It is understood that the camshaft 248 may have other orientations, which may be utilized in accordance with the requirements of the irrigation system 100.

As shown in FIGS. 2A and 2C, the connector conduit 220 (e.g., the second conduit portion 224) is disposed over the conduit 130 and maintains at least substantially vertical alignment with the conduit 130. In an implementation, the connector conduit 220 is a flexible conduit configured to carry liquid from the conduit 130 of the main section assembly 104 to the conduit 132 of the extension section assembly 106. As shown, a first end 256 of the connector conduit 220 is coupled to a house barb 258, which is disposed over the conduit 130. The second end 260 of the connector conduit 220 is coupled to the male swivel elbow assembly 214. The male swivel elbow assembly 214 is coupled to the conduit 132. Thus, when the irrigation system 100 is in bend mode (the drive unit 127 of the end tower structure 122 causes the extension section assembly 106 to pivot about the main section assembly 104), the conduit 132 causes the male swivel elbow assembly 214 to pivot about the ball connector 202 via the socket 209 (and the socket pulley 210), which actuates the belt 238 to cause the camshaft pulley 236 to orientate the camshaft 248 to one or more camshaft orientations as described above. The roller mount assembly 218 is coupled to the male swivel elbow assembly 214 to allow, in part, the assembly 214 to pivot about ball connector 202 without at least substantially displacing (e.g., minimizing displacement of) the connector conduit 220, as well as preventing the connector conduit 220 from becoming disengaged from the male swivel assembly 214 while liquid is traversing the conduits.

It is contemplated that maintaining the connector conduit 220 over the conduit 130 allows the extension section assembly 106 to pivot about the axis A-A without interference from the connector conduit 220. Moreover, by centering the socket 209 and the pulley 210 about the centroid 212 of the ball connector 202, the effects of an adverse terrain are minimized to the belt 238, which assists in ensuring accuracy of the system 100.

FIG. 3 illustrates an example cultivation area 300 (e.g., field) to be at least partially irrigated by the irrigation system 100. As shown, field 300 includes subsections 302, 304, 306. Field subsection 302 and field subsection 304 represent an area available for cultivation, while subsection 306 represents an obstructed or an unavailable area. For example, subsection 306 may represent a building, a wetland, natural obstructions, or the like, that prevents movement of the entire irrigation system 100 over this area. Thus, the main section assembly 104 may traverse an area up (e.g., near) to the subsection 306. The extension section assembly 106 is configured to pivot about the main section assembly 104 by way of the irrigation alignment apparatus 200 to irrigate areas (e.g., field subsection 304) near subsection 306. As shown, the applicant radii (R1, R2) differ based upon the subsection 306. For example, the irrigation system 100 is configured to furnish applicant to crops within a first radius R1 (e.g., at least approximately equal to the length of the main section assembly 104 and the extension section assembly 106) of the subsection 302 up until about the subsection 306, and then the irrigation system 100 is configured to furnish applicant to crops within a second radius R2 (e.g., at least approximately equal to the length of the extension section assembly 106) of the subsection 304. It is contemplated that when the irrigation system 100 nears subsection 306, the dispersion devices along the main section assembly 104 may be deactivated while the extension section assembly 106 continues along the path defined by radius R2.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An irrigation system comprising:
a main section assembly including a first conduit configured to carry liquid;
an extension section assembly including a second conduit configured to carry liquid; and
an irrigation alignment apparatus configured to couple the main section assembly to the extension section assembly, the irrigation alignment apparatus comprising:
a ball connector coupled to the main section assembly;
a socket for receiving the ball connector and coupled to the extension section assembly, the socket configured to at least partially pivot about the ball connector;
a socket pulley coupled to the socket about a centroid of the ball connector, the socket pulley configured to at least partially pivot the socket about the ball connector; and
a camshaft pulley coupled to the main section assembly, the camshaft pulley coupled to the socket pulley via a linking member, wherein the camshaft pulley is coupled to a camshaft, the camshaft in communication with a plurality of switches for controlling at least one of the main section assembly or the extension section assembly, the camshaft configured to indicate a positional alignment of the extension section assembly.

2. The irrigation system as recited in claim 1, wherein the linking member is centered about a horizontal axis defined by the socket pulley.

3. The irrigation system as recited in claim 1, wherein the linking member comprises a flexible cogged belt.

4. The irrigation system as recited in claim 1, wherein the socket pulley has a first diameter and the camshaft pulley has a second diameter, the first diameter at least substantially equal to the second diameter.

5. The irrigation system as recited in claim 1, wherein at least one of the plurality of switches is configured to selectively power a drive unit.

6. The irrigation system as recited in claim 5, wherein at least one switch of the plurality of switches is configured to power down at least one of the main section assembly or the extension section assembly when the extension section assembly is proximate to an obstruction.

7. The irrigation system as recited in claim 5, wherein at least one switch of the plurality of switches is configured to actuate an end gun coupled to the extension section assembly.

8. An irrigation system comprising:
a main section assembly including a first conduit supported upon a plurality of first tower structures, the first conduit configured to carry liquid;
an extension section assembly including a second conduit supported upon a plurality of second tower structures, the second conduit configured to carry liquid; and
an irrigation alignment apparatus configured to couple the main section assembly to the extension section assembly, the irrigation alignment apparatus comprising:
a ball connector coupled to the main section assembly;
a socket for receiving the ball connector and coupled to the extension section assembly, the socket configured to at least partially pivot about the ball connector;
a socket pulley coupled to the socket about a centroid of the ball connector, the socket pulley configured to at least partially pivot the socket about the ball connector; and
a camshaft pulley coupled to the main section assembly, the camshaft pulley coupled to the socket pulley via a linking member,
wherein the camshaft pulley is coupled to a camshaft, the camshaft in communication with a plurality of switches for controlling at least one of the main section assembly or the extension section assembly, the camshaft configured to indicate a positional alignment of the extension section assembly.

9. The irrigation system as recited in claim 8, wherein the positional alignment of the extension section assembly is indicated as a function of an orientation of the camshaft.

10. The irrigation system as recited in claim 8, wherein the linking member is centered about a horizontal axis defined by the socket pulley.

11. The irrigation system as recited in claim 8, wherein the socket pulley has a first diameter and the camshaft pulley has a second diameter, the first diameter at least substantially equal to the second diameter.

12. The irrigation system as recited in claim 8, wherein the camshaft is in communication with a plurality of switches for controlling at least one of the main section assembly or the extension section assembly, wherein at least one switch of the plurality of switches is configured to selectively power the drive unit.

13. The irrigation system as recited in claim 12, wherein at least one switch of the plurality of switches is configured to power down at least one of the main section assembly or the extension section assembly when the extension section assembly is proximate to an obstruction.

14. The irrigation system as recited in claim 12, wherein at least one switch of the plurality of switches is configured to actuate an end gun coupled to the extension irrigation section.

15. An irrigation system comprising:
a center pivot structure;
a main section assembly coupled to the center pivot structure, the main section assembly configured to at least partially traverse about the center pivot structure, the main irrigation section including a first conduit supported upon a plurality of first tower structures, the first conduit configured to carry liquid;
an extension section assembly including a second conduit supported upon a plurality of second tower structures, the second conduit configured to carry liquid;
a third conduit configured to couple the first conduit to the second conduit, the third conduit vertically aligned over the first conduit; and
an irrigation alignment apparatus configured to couple the main section assembly to the extension section assembly, the irrigation alignment apparatus comprising:
a ball connector configured to couple to the main section assembly;

a socket for receiving the ball connector and coupled to the extension section assembly, the socket configured to at least partially pivot about the ball connector;

a socket pulley coupled to the socket about a centroid of the ball connector, the socket pulley configured to at least partially pivot the socket about the ball connector; and a camshaft pulley coupled to the main section assembly, the camshaft pulley coupled to the socket pulley via a linking member, wherein the camshaft pulley is coupled to a camshaft, the camshaft in communication with a plurality of switches for controlling at least one of the main section assembly or the extension irrigation section assembly, the camshaft configured to indicate a positional alignment of the extension section assembly.

16. The irrigation system as recited in claim 15, wherein the positional alignment of the extension section assembly is indicated as a function of an orientation of the camshaft.

17. The irrigation system as recited in claim 15, wherein the linking member is centered about a horizontal axis defined by the socket pulley.

18. The irrigation system as recited in claim 15, wherein the linking member comprises a flexible cogged belt.

19. The irrigation system as recited in claim 15, wherein the socket pulley has a first diameter and the camshaft pulley has a second diameter, the first diameter at least substantially equal to the second diameter.

20. The irrigation system as recited in claim 15, wherein at least one switch of the plurality of switches is configured to selectively power a drive unit.

* * * * *